(12) United States Patent
Koinkar et al.

(10) Patent No.: US 9,122,010 B2
(45) Date of Patent: Sep. 1, 2015

(54) FIBER OPTIC SPLICING SYSTEM

(75) Inventors: Vilas Nabaji Koinkar, Brunei Darussalam (BN); Azmir Zaxquarim, Brunei Darussalam (BN); Yock San Yeow, Brunei Darussalam (BN); Mahmod Yakop, Brunei Darussalam (BN)

(73) Assignee: AMRTUR Corporation Sdn. Bhd, Lumut (BN)

( * ) Notice: Subject to any disclaimer, the term of this patent is extended or adjusted under 35 U.S.C. 154(b) by 0 days.

(21) Appl. No.: 13/982,955

(22) PCT Filed: Jan. 30, 2012

(86) PCT No.: PCT/MY2012/000010
§ 371 (c)(1),
(2), (4) Date: Aug. 30, 2013

(87) PCT Pub. No.: WO2012/105825
PCT Pub. Date: Aug. 9, 2012

(65) Prior Publication Data
US 2013/0336621 A1    Dec. 19, 2013

(30) Foreign Application Priority Data
Feb. 1, 2011   (SG) .................. 201100745-7

(51) Int. Cl.
*G02B 6/255* (2006.01)
*G02B 6/46* (2006.01)

(52) U.S. Cl.
CPC .............. *G02B 6/2553* (2013.01); *G02B 6/255* (2013.01); *G02B 6/46* (2013.01)

(58) Field of Classification Search
CPC .................................................... G02B 6/2553
USPC ............................................ 385/96, 135, 147
See application file for complete search history.

(56) References Cited

U.S. PATENT DOCUMENTS

| 4,727,237 | A | * | 2/1988 | Schantz ................... 219/121.63 |
| 5,228,102 | A | | 7/1993 | Sato et al. |
| 2005/0163447 | A1 | | 7/2005 | Takahashi et al. |
| 2011/0135247 | A1 | * | 6/2011 | Achara et al. ................... 385/12 |

FOREIGN PATENT DOCUMENTS

JP    2008-233228 A    10/2008

* cited by examiner

*Primary Examiner* — Eric Wong
(74) *Attorney, Agent, or Firm* — Muncy, Geissler, Olds & Lowe, P.C.

(57) ABSTRACT

An enclosure system for enclosing a fiber optics splicer so that the fiber optic splicer can be used in hazardous area is disclosed. The enclosure system comprises of an enclosure wherein the top side of the enclosure is adapted to become door of the enclosure and a purging unit connected to the enclosure for performing pressure purging within the enclosure system, wherein the purging unit comprises a pressure purge unit, an air-pumping device, and pressure gauges. A fusion splicer and fiber optic cables to be spliced are installed inside the enclosure and the top side of the enclosure is locked and sealed using a sealing unit. The sealing unit is made of soft materials that conforms around the fiber optic cables to be spliced, hence do not damage the fiber optic cables. Using the purging unit of the enclosure system, flammable gas inside the fiber optics enclosure system is displaced with non-flammable air or inert gas. During splicing, the enclosure system also maintains positive pressure inside the enclosure, hence preventing any flammable gas from entering the enclosure. With the enclosure system, splicing of fiber optics can be done safely, even in a hazardous area, using the fusion splicer installed in the enclosure system. A method utilizing the enclosure system for splicing of fiber optics is also disclosed herein.

17 Claims, 3 Drawing Sheets

FIBER OPTIC SPLICING SYSTEM

FIELD OF THE INVENTION

The present invention relates to fiber optic splicing. In particular, the present invention relates to an enclosure system for performing safe fiber optic splicing in hazardous area where explosive environment is present.

BACKGROUND

Fiber optics has been amazingly used in industries nowadays, including telecommunications, defense, food and drug, mining and oil and gas industry. A fiber optic cable comprises of a core made of plurality of layers of glass with different optical properties and a cladding material surrounding the core. Typical diameter of the cladding material is 125 µm. Based on its purposes, the core might be 8 to 9 µm in a single-mode fiber or 50 or 62.5 µm diameter in a multiple-mode fiber. Single-mode core is used for long-distance communication links, whilst multiple-mode core is used for short-distance communication links and for high power transmission. A protective coating is applied after the cable is drawn to give further protections to the fiber optic cable.

Typically, transmission by fiber optics is preferred in particular industries due to some important features of the fiber optics. Fiber optics has large information and long span distances carrying capacity for the use in telecommunications industry. It is also very light, making it suitable for installation in aircraft. Furthermore, unlike electrical transmission, fiber optics transmission does not generate sparks that it can be used safely in hazardous area wherein flammable or explosive gas presents.

The fiber optics sensors are widely used to measure the physical properties, such as temperature, pressure, strain, stress, acoustic, etc, in various industries. For new installations and maintenance of fiber optics, it is often necessary to splice the fiber optics in order to integrate a first fiber optic to a second fiber optic. Typically, fiber optics splicing is achieved through arc or filament heating wherein two fibers are fused together. Fusion splicing uses heat to join two fiber optics. The source of heat comes from an electric arc or a tungsten filament. Instead of fusion splicing, mechanical splicing might also be utilized as an alternative for splicing. However, this alternative technique yield splice with higher optical loss and lower reliability compared to fusion splicing, and therefore fusion splicing is preferable than mechanical splicing.

Fiber optic splicing can be done using fusion splicer. Various types of fusion splicer are currently available in the market. Due to safety issues, the fiber optic splicers are recommended for use only in a non-hazardous area or safe zone area such as splicing laboratory or clean room, wherein no flammable gas/particles are present nearby. Several steps are taken to splice fiber optics using the fusion splicer. The coating of the fiber optics to be spliced is removed beforehand and the bare fiber optics are cleaned using isopropyl alcohol or other solvents. Next, each fiber optics is cleaved and aligned into fiber holders. The fiber holders are then installed into the fusion splicer and the two fibers are fused together either by arc or filament heating. After the splicing is completed, the splice area is re-coated using protection sleeve.

Due to increment of the use of fiber optics in industries, there is indeed a need to perform fiber optics fusion splicing safely and efficiently in any kind of working environments. U.S. Pat. No. 7,693,385 discloses a workstation designed for performing fiber optics fusion splicing in an aerial bucket truck. The workstation comprises a support structure mounted to the bucket of the aerial bucket truck and a pocket mounted in the support structure for holding fusion splicer firmly. With this workstation, a technician can perform splicing while he is sitting in the aerial bucket truck, 15 to 30 feet above the local terrain.

SUMMARY

In one aspect of the present invention, there is provided a portable fiber optic splicing enclosure system comprising an enclosure for housing a fiber optic splicer, wherein top side of the enclosure is adapted to become door of the enclosure, and a purging unit connected to the enclosure for performing pressure purging within the enclosure. The purging unit of the enclosure system comprises a pressure purge unit, an air-pumping device, and pressure gauges. During splicing, the enclosure of the enclosure system further encloses fiber optic cables to be spliced.

In one embodiment, the enclosure further comprises plurality of latches for locking the top side of the enclosure as top side of the enclosure is closed In a further embodiment, the top side of the enclosure further comprises a sealing unit for sealing the enclosure and fiber optic cables to be spliced, thoroughly preventing any flammable gas from entering the enclosure, as the top side of the enclosure is locked. The sealing unit is made of soft materials that conform around the fiber optic cables to be spliced and do not crush the fiber optic cables to be spliced as the cables are installed into the enclosure.

In yet another embodiment, the air-pumping device of the enclosure system is a portable pumping device which can be operated either by hands or feet. It is also possible that an electrically-powered pumping device is used herein.

In a further embodiment, the air-pumping device has a check device for controlling amount of non-flammable gas delivered to the enclosure system during pressure purging.

In yet a further embodiment, the air-pumping device of the enclosure system is further connected to a portable inert gas cylinder, so as to purge the enclosure with the inert gas.

In another embodiment, the enclosure is adapted to have handle so that the enclosure system can be easily moved.

In yet another embodiment, the enclosure has a mean for securing a fiber optic splicer installed inside the enclosure.

In yet another embodiment, the enclosure has a transparent window with push buttons embedded in front side of the enclosure. When a fiber optic splicer is installed inside the enclosure, it is necessary to associate operating buttons of the fiber optic splicer with the push buttons of the enclosure so that operation of the fiber optics splicer can be controlled by the push buttons and monitored from outside through the transparent window.

In a further embodiment, the enclosure system has an alarm system for notifying users when there are any flammable gases/particles inside the enclosure.

In another aspect of the present invention, there is provided a method for splicing fiber optics using the portable fiber optic splicer enclosure system. The method comprises of installing a fusion splicer to the fiber optic splicer enclosure system in such a way that operating buttons of the fusion splicer is associated with push buttons of the fiber optic splice enclosure system; identifying whether the fiber optic splicer enclosure system has any leakage; preparing fiber optics cable for splicing; pressure purging the fiber optic splicer enclosure system; splicing the fiber optics; and coating the spliced fiber optics with fiber splice protection sleeve. Once the spliced fiber is coated with the fiber protection sleeve, the fiber optics splicer enclosure system is depressurized and a final product of spliced fiber optics is obtained therefrom.

BRIEF DESCRIPTION OF THE DRAWINGS

This invention will be described by way of non-limiting embodiments of the present invention, with reference to the accompanying drawings, in which.

DETAILED DESCRIPTION

Figure 1:
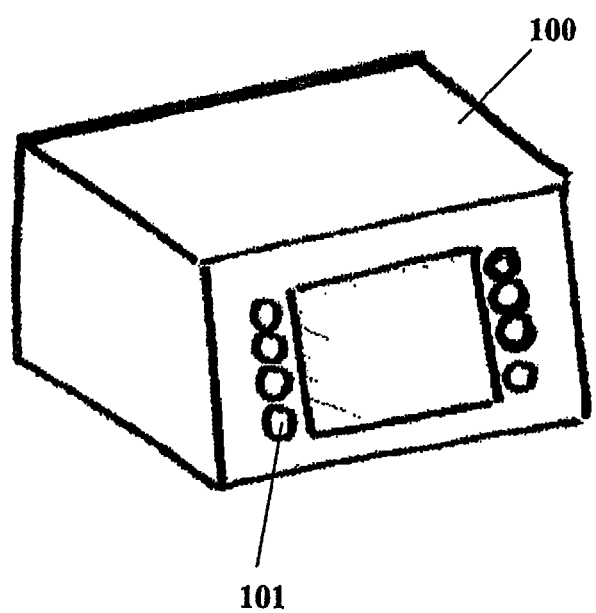
FIG. 1 exemplifies one fusion splicer in accordance with one embodiment of the present invention.

The following descriptions of a number of specific and alternative embodiments are provided to understand the inventive features of the present invention. It shall be apparent to one skilled in the art, however that this invention may be practiced without such specific details. Some of the details may not be described in length so as to not obscure the invention. For ease of reference, common reference numerals will be used throughout the figures when referring to same or similar features common to the figures.

FIG. 1 exemplifies one fusion splicer 100, which is currently available in the market, in accordance with one embodiment of the present invention. The fusion splicer 100 has operating buttons 101 to control the operation of the fusion splicer 100. Different configuration of operating buttons 101 is also possible in other embodiment of the present invention. In a further embodiment, the fusion splicer 100 is also operable via control of a computer The fusion splicer 100 is effective in yielding good splice with low optical loss in relatively short time (in seconds). Nevertheless, the fusion splicer 100 is not safe to use in hazardous area. Hazardous area is defined as an area in which ignitable concentrations of flammable gases or vapours or particles can exist under normal operating conditions. Hazardous area is commonly found in oil and gas refineries, mining operations, manholes, storage room of explosive and flammable materials and liquids.

Figure 2:
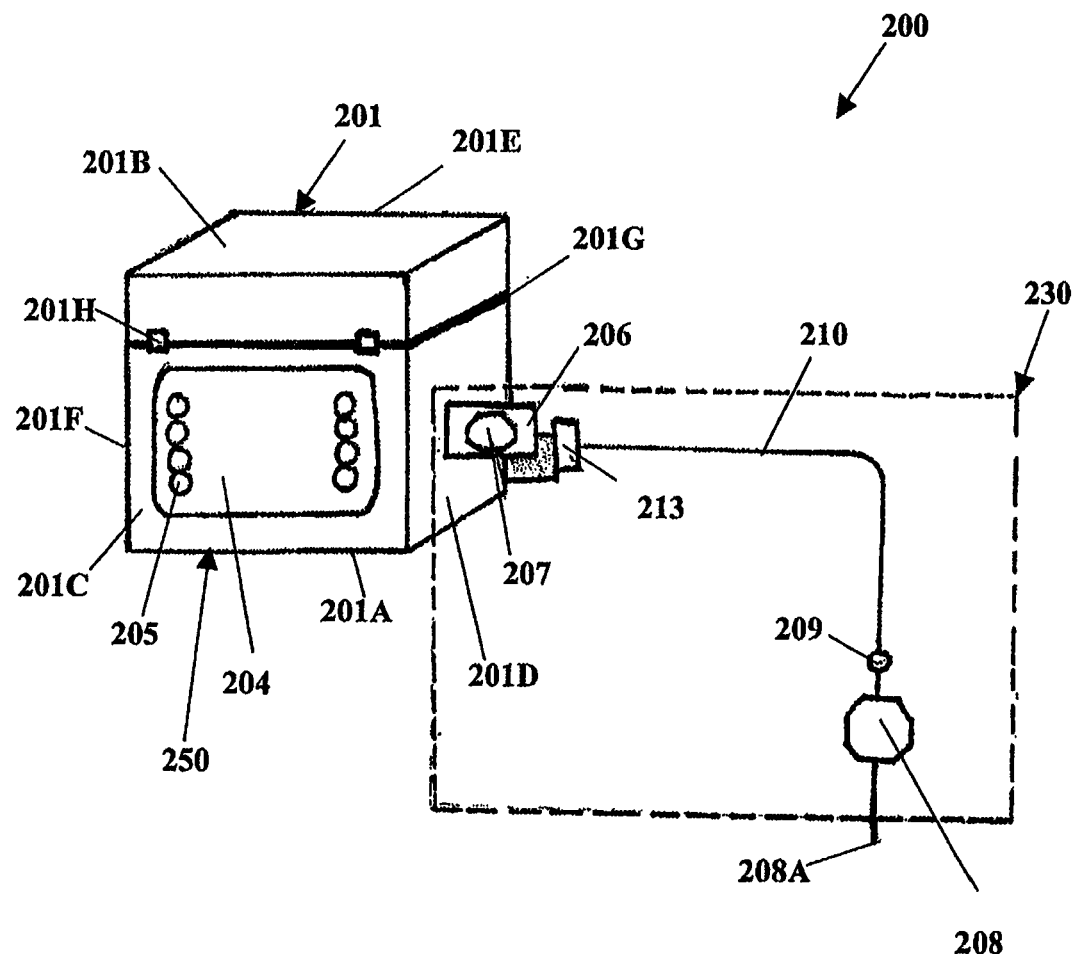
FIG. 2 illustrates a fiber optic splicer enclosure system 200 according to one embodiment of the present invention.

As discussed above, an increment of use of fiber optics in industries has driven a need for being able to perform fiber optic splicing using fusion splicer 100 anytime, anywhere, including in the hazardous area. To overcome safety issues related to the use of fusion splicer 100 in the hazardous area, a portal cabin or a clean room is typically built for performing fusion splicing safely. However, the portal cabin requires large space and heavy lifting equipments, hence it cannot be installed in narrow or confined space. The portal cabin is, therefore, installed or located in some distances from point of interest causing it to take more times to do splicing than it is supposed to be. These shortcomings of splicing are, therefore, becoming major hurdles in industries, especially in oil and gas industry where space, safety, time, and cost are prime considerations for profitability of the industry FIG. 2 illustrates a fiber optic splicer enclosure system 200 according to one embodiment of the present invention. The enclosure system 200 is designed and developed for splicing two fiber optic cables safely in hazardous area. The enclosure system 200 is capable of displacing flammable gases/particles environment before splicing, hence providing clean and non-hazardous environment for splicing. The enclosure system 200 also helps maintaining the non-hazardous environment during splicing. Moreover, the enclosure system 200 acts to enclose the fiber optic splicer 100, preventing it from exposure to the hazardous environment outside the enclosure system 200 once the fusion splicer 100 installed. Hence, by installing the fusion splicer 100 inside the enclosure system 200, splicing can be done safely in the hazardous area, regardless presence of any flammable gases/particles around the hazardous area.

Referring to FIG. 2, the enclosure system 200 has an enclosure 201 for housing the fusion splicer 100. In one embodiment of the present invention, the enclosure 201 comprises horizontal sides including a bottom side 201A and a top side 201B, and vertical sides including a front side 201C, a right side 201D, a back side 201E, and a left side 201F. The bottom side 201A and the vertical sides 201C, 201D, 201E, 201F are adapted to become a container 250, whilst the top side 201B is hinged into the container 250, adapted to become door of the container 250. To close and lock the top side 201B into the container 250, there is provided plurality of latches 201H, the latches 201H are embedded in the front side 201C, right side 201D, and left side 201E of the container 250. The enclosure 201 further comprises sealing unit 201G, which is made of soft materials, to seal the top side 201B to the container 250 thoroughly during splicing operation, preventing any leakage. The sealing unit 201G comprises two seals, each is embedded in the container 250 and the top side 201B respectively. The sealing unit 201G has a wide sealing area and a flat and smooth sealing surface.

In another embodiment of the present invention, geometrical shape of the enclosure 201 might be varied as desired.

Still referring to FIG. 2, to monitor operation of the fusion splicer 100 installed inside the enclosure 201 from outside, a transparent window 204 with push buttons 205 is embedded into one of vertical sides, preferably the front side 201C, of the enclosure 201. The push buttons 205 are specially designed so that they are associated with the operating buttons 102 of the installed fusion splicer 100, hence operations of the fusion splicer 100 can be controlled via the push buttons 205. The push buttons 205 of the enclosure 201 are sealed thoroughly, and therefore, the push buttons 205 can be operated without affecting pressure of the enclosure 201. The operation of push buttons 205 does not cause any leakage from the enclosure 201 to atmosphere either.

Still referring to FIG. 2, in the present embodiment, the right side 201D of the enclosure 201 is connected to a purging unit 230. In another embodiment, it is also possible to have the left side 201F of the enclosure 201 connected to the purging unit 230. The purging unit 230 is used to displace flammable gas from the enclosure 201 as well as maintaining pressure of the enclosure 201 at desired value. In the present embodiment, the purging unit 230 comprises a pressure purge unit 206, an air-pumping device 208, an air filter 213, and pressure gauges 207, 209. The pressure purge unit 206 is used for controlling pressure inside the enclosure 201. The pressure value inside the enclosure 201 is shown by pressure gauge 207. It is desired that the pressure inside the enclosure 201 is maintained at positive value, preferably at a minimum value of 0.5 mbar, during purging and splicing. When the pressure inside the enclosure 201 is not in positive value, the pressure purge unit 206 will adjust the pressure into a positive value. Due to its positive pressure, any flammable gas, vapour and/or particles inside the enclosure 201 can be displaced from the enclosure 201, and flushed with clean air. The positive pressure inside the enclosure 201 also prohibits explosive gases, vapours, and/or particles from entering the enclosure 201, thus ensuring safety during operation of the fusion splicer 100 inside the enclosure 201.

Referring again to FIG. 2, the air-pumping device 208 connected to the purging unit 230 is designed to take air from non-hazardous area through its inlet 208A and deliver the non-flammable, clean air to the enclosure 201 through a hose 210. The amount of non-flammable air delivered is controlled by check device 213 and its pressure is shown by pressure gauge 209. The process of exchanging the flammable air inside the enclosure 201 with non-flammable air is called pressure purging. Instead of using non-flammable air from non-hazardous area to pressure purge the enclosure 201, inert gas, such as nitrogen or argon, might also be used herein.

In the present embodiment, the air-pumping device 208 is a portable pumping device. The device can be operated either by hands or feet. In another embodiment, the air-pumping device 208 is an electrically powered pumping device.

In a further embodiment of the present invention, the enclosure system 200 may further has an alarm system. The alarm system is helpful that it warns users when any flammable gas is present inside the enclosure 201 of the enclosure system 200.

Several steps are necessary to operate the enclosure system 200 for splicing two fiber optic cables in hazardous area. First, it is required to install the fusion splicer 100 into the enclosure 201 in such a way that operation buttons 102 of the fusion splicer 100 is in line with the push buttons 205 of the enclosure 201. The top side 201B of the enclosure 201 is then closed and sealed using the sealing unit 201G. Next, the enclosure system 200 is tested to identify any leakage. After leakage test, pressure inside the enclosure 201 is vented to atmospheric pressure and the top side 201B of the enclosure 201 is opened. Subsequently, optical fiber cables are prepared and installed into the fusion splicer 100. The top side 201B of the enclosure 201 is then locked with the latches 201H, sealed with the sealing unit 201G. At the same time, the fiber optic cables are also sealed thoroughly. It is essential to note that the sealing unit 201G of the present invention is designed in such a way that the optical fiber cables are not damaged while sealed by the sealing unit 201G. The sealing unit 201G, which is made of soft materials, conforms around the fiber optic cables and does not crush the fiber optic cables. Moreover, the wide sealing area and flat surface of the sealing unit 201G help to prevent any leakage to occur while the fiber optic cables are installed to the sealing unit 201G. Once the enclosure 201 is sealed, pressure purging is then carried out using the purging unit 230, for exchanging the flammable gas inside the enclosure with non-flammable gas and maintaining pressure of the enclosure 201 at a positive value. After purging, the fusion splicer 100 power is then turned on by pressing the push buttons 205 and splicing operations mode is chosen using push buttons 205 from outside of the enclosure 201. When the splicing is done, the fusion splicer 100 is switched off and pressure is released from the enclosure 200 so that the top side 201B of the enclosure 201 can be opened. Next, fiber splice protection sleeve/tube is slide over the spliced fiber and set into small heating oven in the fusion splicer 100. The fiber splice protection sleeve/tube is functioned to coat the spliced fiber for further protecting the spliced fiber. After sliding the fiber splice protection sleeve/tube, the top side 201B of the enclosure 201 is closed and pressure purging is performed again. In the small heating oven, the fiber splice protection sleeve/tube is coated on to the spliced fiber by pressing the push button 205. After the fiber splice protection sleeve/tube coats the spliced fiber, the enclosure 201 is depressurized and the top side 201B of the enclosure 201 is opened. A spliced fiber cable is obtained therefrom. The above-mentioned steps are repeated for splicing more fiber optics cable.

Figure 3:
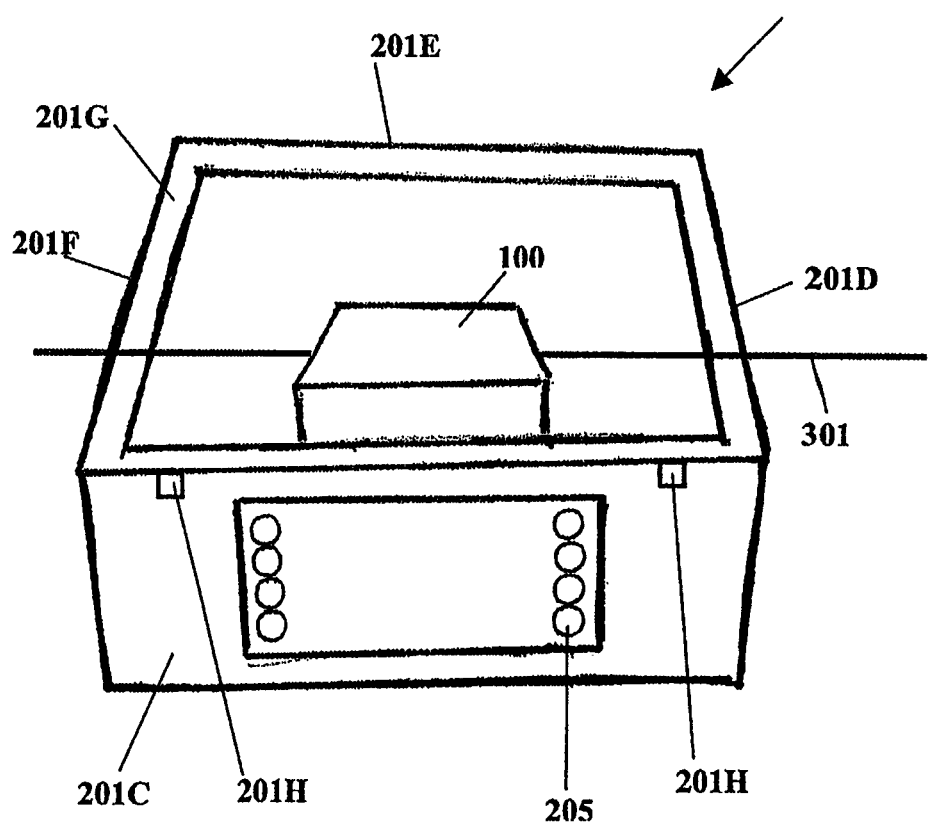
FIG. 3 shows interior of enclosure of the fiber optic splicer enclosure system of FIG. 2.

FIG. 3 illustrates a top view of container 250 of the enclosure 201 of the enclosure system 200. The container 250 of the enclosure 201 is a hollow space to accommodate the fusion splicer 100. The fusion splicer is installed 100 in such a way that their operating buttons are aligned with push buttons 205 of the enclosure 201. In the hollow container 250 of the enclosure 201, there is provided a mean for securing position of the fusion splicer 100. Fiber optic cables 301 are sealed with the sealing unit 201G on the top and bottom side of the enclosure 201 during splicing. As elaborated above, the sealing unit 201G is made of soft materials that can conform around the fiber optic cables, hence not damaging/crushing the fiber optic cables 301 as the door of the enclosure 201 is locked. Further, the wide sealing area and smooth surface of the sealing unit 201G also help to prevent the fiber optic cables 301 from being damaged during splicing.

The enclosure system 200 is a portable system with small footprint. The system 200 is practical for safe splicing of fiber optics cable in hazardous area. Moreover, the enclosure system 200 is very helpful when space available for splicing is limited. The enclosure system 200 is self-supported too that it can be used in areas where electrical power and other utilities are not available. With enclosure system 200, fiber optics splicing can be performed on rig floor, wellhead of oil and gas well, and in any other hazardous area, in which space, safety, time and cost are carefully concerned. The enclosure system 200, therefore, adds significant values to the use of fiber optics in telecommunication, oil and gas, military, automotive, biomedical, and many other industries.

The above description illustrates various embodiments of the present invention along with examples of how aspects of the present invention may be implemented. While specific embodiments have been described and illustrated it is understood that many changes, modifications, variations and combinations thereof could be made to the present invention without departing from the scope of the present invention. The above examples, embodiments, instructions semantics, and drawings should not be deemed to be the only embodiments, and are presented to illustrate the flexibility and advantages of the present invention as defined by the following claims:

The invention claimed is:

1. A method for splicing fiber optics, the method comprising the steps of:
    installing a fusion splicer to a fiber optic splicing enclosure system in such a way that the operating buttons of the fusion splicer are associated with push buttons of the fiber optic splice enclosure system;
    identifying any leakage in the fiber optic splicing enclosure system;
    preparing fiber optic cables for splicing;
    pressure purging the fiber optic splicing enclosure system to exchange flammable gas inside the fiber optic splicing enclosure system with non-flammable gas;
    splicing the fiber optic cables; and
    coating the spliced fiber optics with fiber splice protection sleeve, comprising the steps of:
        switching the fusion splicer off;
        depressurizing the fiber optics splicing enclosure system;
        opening top side of the enclosure of the fiber optics splicing enclosure system;
        setting the fiber protecting sleeve to small heating oven in the fusion splicer;
        closing top side of the enclosure of the fiber optics splicing enclosure system; and
        pressure purging the fiber optics splicing enclosure system.

2. The method according to claim 1, wherein the fiber optic splicing enclosure system comprises:
- an enclosure for housing said fusion splicer wherein the top side of the enclosure is a door of the enclosure; and
- a purging unit for performing said pressure purging within the enclosure using said non-flammable gas taken from a non-hazardous area, wherein the purging unit comprises a pressure purge unit which, is equipped with a pressure gauge, connects to an air pumping device equipped with another pressure gauge, and the purging unit is connected to the enclosure via the pressure purge unit to remove said flammable gas from said enclosure;
- whereby said fiber optic splicing is performed in said enclosure while said enclosure is in a hazardous area having flammable gas.

3. The method of claim 1, further comprising obtaining the spliced fiber optics after the fiber optics splicing enclosure system is depressurized.

4. The enclosure system of claim 2, wherein the enclosure further encloses said fiber optic cables to be spliced.

5. The enclosure system of claim 4, wherein the enclosure further comprises a plurality of latches for locking the top side of the enclosure as the top side of the enclosure is closed.

6. The enclosure system of claim 5, wherein the enclosure further comprises a sealing unit for sealing the enclosure and the fiber optics cables to be spliced thoroughly, as the top side of the enclosure is locked.

7. The sealing unit of claim 6, wherein the sealing unit is made of soft materials that conform around the fiber optic cables to be spliced and do not crush the fiber optic cables to be spliced as the cables are installed into the enclosure and the top side of the enclosure is locked.

8. The enclosure system of claim 6, wherein the air-pumping device is a portable pumping device which can be operated either by hands or feet.

9. The enclosure system of claim 6, wherein the air-pumping device is an electrically powered pumping device.

10. The enclosure system of claim 6, wherein the air-pumping device has a check device for controlling amount of non-flammable gas delivered to the enclosure system.

11. The enclosure system of claim 6, wherein the air-pumping device is further connected to a portable inert gas cylinder for pressure purging the enclosure.

12. The enclosure system of claim 2, wherein the enclosure is further adapted to have handle so that the enclosure system can be easily moved.

13. The enclosure system of claim 2, wherein the enclosure further has a means for securing a fiber optic splicer installed inside the enclosure.

14. The enclosure system of claim 2, wherein the enclosure has a transparent window with a plurality of said push buttons embedded in front side of the enclosure.

15. The enclosure system of claim 14, wherein the fiber optic splicer is installed into the enclosure such that the operating buttons of the fiber optic splicer are associated with the push buttons so that operation of the fiber optics splicer can be controlled and monitored externally from the enclosure.

16. The enclosure system of claim 2, wherein the enclosure system further has an alarm system for notifying users when flammable gas/particle is in presence inside the enclosure.

17. The method of claim 1, wherein the step of pressure purging comprising:
- maintaining a positive pressure inside the enclosure.

* * * * *